United States Patent
Neira et al.

(10) Patent No.: US 6,549,165 B2
(45) Date of Patent: Apr. 15, 2003

(54) OCEAN ALTIMETRY INTERFEROMETRIC METHOD AND DEVICE USING GNSS SIGNALS

(75) Inventors: Manuel Martin Neira, Oegstgeest (NL); Pablo Colmenarejo Matellano, Madrid (ES); Giulio Ruffini, Barcelona (ES)

(73) Assignee: Agence Spatiale Europeenne (FR)

( * ) Notice: Subject to any disclaimer, the term of this patent is extended or adjusted under 35 U.S.C. 154(b) by 0 days.

(21) Appl. No.: 09/766,455

(22) Filed: Jan. 19, 2001

(65) Prior Publication Data

US 2002/0130813 A1 Sep. 19, 2002

(51) Int. Cl.⁷ .............................. G01S 3/02; G01S 5/14
(52) U.S. Cl. ................... 342/462; 342/357.06; 342/453
(58) Field of Search ................. 342/462, 453, 342/357.06

(56) References Cited

U.S. PATENT DOCUMENTS

| 4,828,382 | A | * | 5/1989 | Vermilion | 342/453 |
| 5,546,087 | A | * | 8/1996 | Martin Neira | 342/120 |
| 6,130,644 | A | * | 10/2000 | Massonnet | 342/453 |
| 6,232,922 | B1 | * | 5/2001 | McIntosh | 342/453 |

OTHER PUBLICATIONS

Lowe, Stephen et al, "An Ocean–Altimetry Measurement Using Reflected GPS Signals Observed Froma Low Altitude Aircraft", IEEE 2000 International Geoscience and Remote Sensing Symposium, Jul. 2000, pp. 2185–2187, vol. 5.*
Zuffada, Cinzia et al, "Altimetry With Reflected GPS Signals: Results From a Lakeside Experiment", IEEE 2000 International Geoscience and Remote Sensing Symposium, Jul. 2000, pp. 2864–2866, vol. 7.*

* cited by examiner

*Primary Examiner*—Gregory C. Issing
(74) *Attorney, Agent, or Firm*—Bachman & LaPointe, P.C.

(57) ABSTRACT

A method for performing Earth altimetry comprising the steps of: receiving by an upward-looking antenna onboard a platform above the Earth surface, direct signals having at least two different carrier frequencies transmitted by GNSS satellites in view of the upward-looking antenna, receiving by a downward-looking antenna onboard the platform signals reflected by the Earth surface and having the at least two different carrier frequencies, comparing carrier phases of the direct signals and received reflected signals, at the carrier frequencies, and determining from the phase comparisons a surface height.

12 Claims, 2 Drawing Sheets

OCEAN ALTIMETRY INTERFEROMETRIC METHOD AND DEVICE USING GNSS SIGNALS

BACKGROUND OF THE INVENTION

1. Field of the Invention

The present invention concerns an altimetry method performed from the air or space, especially ocean, altimetry.

The present invention also concerns a device for implementing the method.

2. Description of the Prior Art

There are many methods for carrying out ocean altimetry. The three main parameters associated with these methods and defining their respective performance are: vertical precision, spatial resolution and swath.

Most conventional methods are based on the use of radar emitting signals of suitable wavelength, for example airborne radar. There are various types of radar: single-pulse system, interferometric system, etc. Altimetry of this type has been mostly limited to nadir-looking type instruments, restricting the range of possibilities.

Some prior art methods use existing radio frequency signals and combine in an airborne or space receiver signals from the transmitter (direct signals) and signals reflected from the ocean (or, more generally, from the terrestrial surface). In the following description the expression "terrestrial surface" refers to the terrestrial crust, or to the surface of oceans, seas or lakes, or to the surface of frozen water.

Usable existing sources of radio frequency signals, known as "sources of opportunity", include communication, television and navigation satellites systems such as the "GPS" ("Global Positioning Satellite"), a satellite navigation system used in the West and its equivalent GLONASS in the former Soviet Union or the future European Galileo system. The navigation signals from a Global Navigation Satellite System (GNSS) are particularly suited for altimetry application.

The patent U.S. Pat. No. 5,546,087 discloses an altimetry method with a specific application to estimating the height of seas of oceans and variations therein.

This method uses the amplitude of multiple correlations of the direct and reflected signals. However, the vertical accuracy obtained by this method is limited to the bandwidth of the opportunity signals. A better precision can be achieved by combining measurements, resulting in a loss in spatial resolution.

SUMMARY OF THE INVENTION

An object of the present invention is to improve the vertical accuracy obtained in the measurement of height variations of the ocean surface using GNSS signals in order to achieve an accuracy in the mean sea level below 10 cm.

The present invention: provides a method for performing Earth altimetry comprising the steps of:

receiving by an upward-looking antenna onboard a platform above the Earth surface, direct signals having at least two different carrier frequencies transmitted by GNSS satellites in view of said upward-looking antenna, receiving by a downward-looking antenna onboard said platform signals reflected by the Earth surface and having said at least two different carrier frequencies, comparing carrier phases of said direct signals and received reflected signals, at said carrier frequencies, and determining from said phase comparisons a surface height.

According to an aspect of the present invention, the method further comprises a step of processing said direct signals to provide time, position and velocity of the phase center and clock of a GNSS receiver.

According to another aspect of the present invention, the method further comprises receiving direct and reflected signals having three different carrier frequencies.

Another object of the present invention is a device for performing Earth altimetry with an accuracy in the mean level below 10 cm. This device comprises:

an upward-looking antenna onboard a platform, for receiving direct signals having at least two carrier frequencies from GNSS satellites in view, a downward-looking antenna onboard said platform for receiving signals at said carrier frequencies, these signals being transmitted by each of said GNSS satellites and reflected by the Earth surface, a GNSS receiver connected to said upward-looking antenna for providing direct signals having said carrier frequencies, a frequency de-multiplexer connected to said downward-looking antenna for separating said received reflected signals into reflected signals having respectively said carrier frequencies, means for comparing carrier phases of said direct signals outputted by said GNSS receiver and reflected signals outputted by said frequency de-multiplexer, at said carrier frequencies, and means for determining a surface height from said phase comparisons.

For simplicity, but without any intention of limiting the invention, the remainder of this description concerns signals from the GPS satellite system and a receiver according to the present invention, which is onboard a satellite in Low Earth Orbit ("LEO"). This receiver can be also an airborne receiver without departing from the scope of the invention.

Also for reasons of simplicity, unless otherwise indicated the remainder of this description concerns only specular reflection. Signals obtained by diffuse reflection can nevertheless be used, especially in sea ice mapping applications.

The invention will be more clearly understood and other features and advantages of the invention will emerge from a reading of the following description given with reference to the appended drawings.

DETAILED DESCRIPTION OF THE PREFERRED EMBODIMENT

Figure 1:
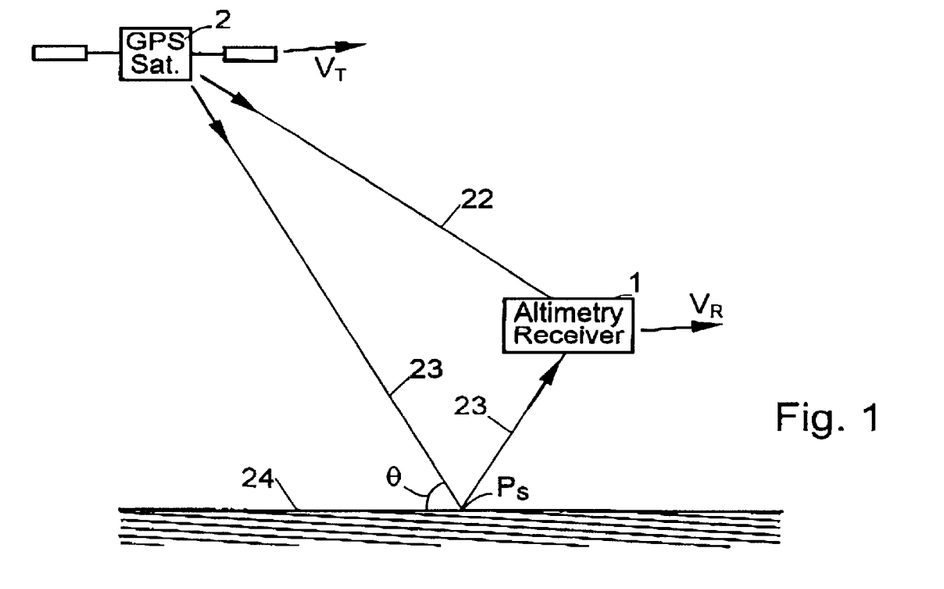
FIG. 1 schematically illustrates a GPS satellite and a receiver onboard a satellite or an aircraft for performing ocean altimetry according to the present invention.

The major characteristics of the invention will now be detailed. As depicted in FIG. 1, a GPS satellite 2 having a speed vector $\vec{V}_T$ transmits navigation signals to a receiver 1 onboard a Low Earth Orbit satellite or an aircraft having a speed vector $\vec{V}_R$.

Figure 2:
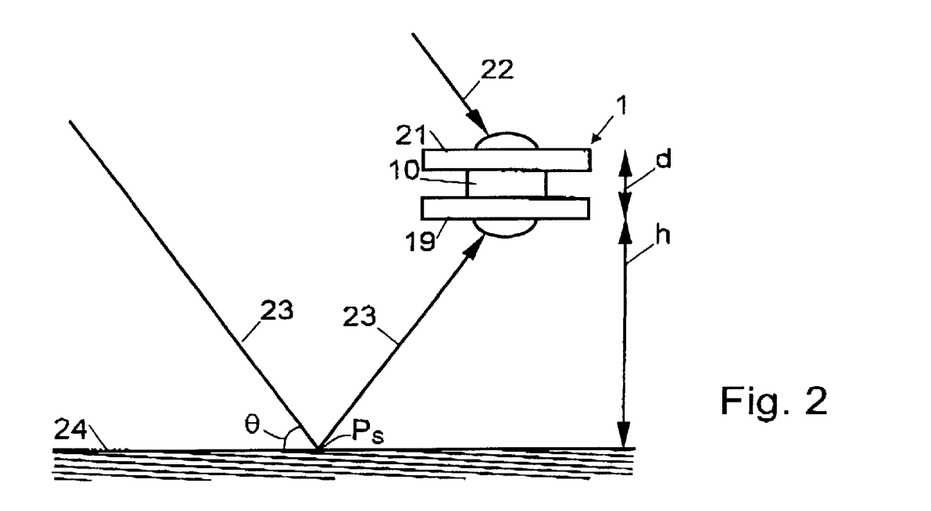
FIG. 2 is a more detailed view of the onboard receiver shown in FIG. 1.

As shown in FIG. 2, the receiver 1 according to the present invention comprises an upward-looking antenna 21 or oriented towards a zenith axis, a downward-looking antenna 19 or oriented towards a nadir axis, and a signal processing unit 10. The upward-looking antenna 21 is designed to receive signals 22 transmitted directly by satellites of a navigation system GNSS (Global Navigation Satellite System), such as the Global Positioning System, whereas the downward-looking antenna 19, which may generally be more directive than the upward-looking one, is designed to receive signals 23 transmitted by the GPS satellites which are reflected by the Earth surface 24, and in particular the ocean surface.

Both the upward- and downward-looking antennas 21, 19 are designed to receive both right-hand and left-hand circular polarizations (LHCP and RHCP).

Figure 3:
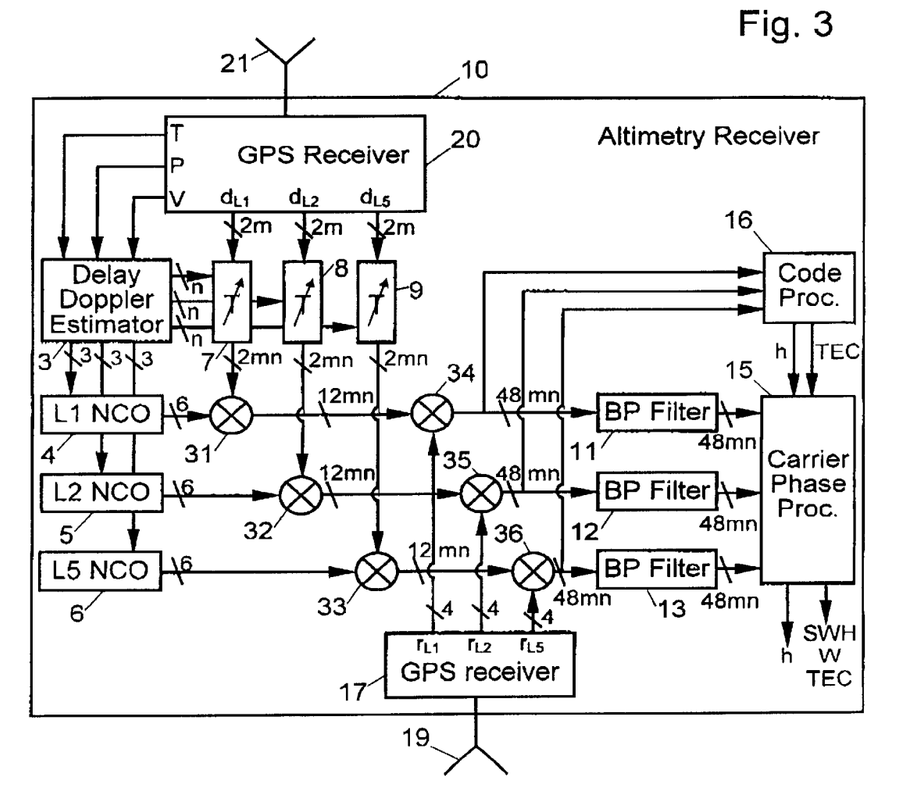
FIG. 3 is a block diagram of one embodiment of the onboard receiver shown in FIG. 1.

As detailed in FIG. 3, the signal processing unit 10 comprises a CXPS receiver 20 to which the signals received by the upward-looking antenna 21 are applied, for determining from the signals transmitted by the GPS satellites, time T, WGS-84 time-position $\vec{P}$ and time drift-velocity $\vec{V}$ vectors corresponding respectively to current time, position and velocity of the receiver 1.

According to the invention, the GPS receiver 20 receives at least two signals having different carrier frequencies, and preferably three different signals having respective carrier frequencies L1, L2, L5. For an optimum performance, the respective frequencies of the signals received should be properly spaced, with two carrier frequencies close together (L2 and L5) and a third carrier frequency (L1) further away from the two first ones. For example, these frequencies are as follows: L1=1575 MHz, L2=1227 MHz and L5=1176 MHz. These signals are received with the both circular polarizations and each circularly polarized signal is processed separately in the GPS receiver 20.

The direct signals received through the upward-looking antenna are expressed as follows for each frequency and polarization:

$$d_{ij}(t) = \sum_{k=1}^{m} d_{ijk}(t) \quad (1)$$

where i indicates the polarization, j the carrier frequency (L1, L2, L5), m the number of GPS satellites being received, and $d_{ijk}(t)$ the signal from a particular $k^{th}$ GPS satellite.

Assuming that there are a C/A- and P-codes (C/A—Coarse/Acquisition and P—Precise Code in the case of GPS) modulating each of the three carrier frequencies and that the upward-looking antenna 21 has a gain of 0 dB, the signal received from any particular satellite can be written as follows:

$$d_{ijk}(t) = \quad (2)$$
$$\sqrt{2\alpha_i P_{C,k}} \, XG_k\left(t - \frac{A_k}{f_j^2}\right) D_k\left(t - \frac{A_k}{f_j^2}\right) \cos\left[2\pi\omega_{jk}\left(t + \frac{A_k}{f_j^2}\right) + \phi_{ijk}\right] +$$
$$\sqrt{2\alpha_i P_{P,k}} \, XP_k\left(t - \frac{A_k}{f_j^2}\right) D_k\left(t - \frac{A_k}{f_j^2}\right) \sin\left[2\pi\omega_{jk}\left(t + \frac{A_k}{f_j^2}\right) + \phi_{ijk}\right]$$

where $\alpha_i$ is a polarization mismatch factor, $P_{C,k}$, $XG_k(t)$ and $P_{P,k}$, $XP_k(t)$ are respectively the power and pseudo-random sequence corresponding to the C/A- and P-codes of the $k^{th}$ satellite, $D_k(t)$ is the navigation data, $f_j$ is the carrier frequency $L_j$ (L1, L2, L5), $\omega_{jk}$ is the $L_j$ carrier frequency shifted by doppler and $k^{th}$ GPS satellite clock errors, $\phi_{ijk}$ is the phase at t=0, and $A_k$ is a constant related to the total electron content (TEC) of the ionosphere in the path between the Antenna 21 and the $k^{th}$ GPS satellite, and can be obtain as follows:

$$A_k = \frac{40.3}{c} TEC_k \quad (3)$$

c being the speed of light in vacuum.

The GPS receiver 20 performs essentially all the functions of a typical GPS receiver for each frequency and modulation, and has an additional feature of providing as output replicas $d_{L1}$, $d_{L2}$ and $d_{L5}$ of the punctual coherent references for each carrier frequency L1, L2 and L5 received. These output signals are clean versions of the direct signals arriving to the antenna 21 from every GPS satellite 2 in view, at each polarization and carrier frequency, shifted to some intermediate frequency IF. They have the same delay and doppler components as the incoming direct signals received through the antenna 21. Clean replicas can be generated for each modulating code (C/A and P). Such a clean replica for the P-code can be expressed as follows:

$$d_{ijk}(t) = \sqrt{2\alpha_i P_{P,k}} \, XP_k\left(t - \frac{A_k}{f_j^2}\right) \quad (4)$$
$$D_k\left(t - \frac{A_k}{f_j^2}\right) \sin\left[2\pi(\omega_{jk} - \omega_{LO,j})\left(t + \frac{A_k}{f_j^2}\right) + \phi_{ijk}\right]$$

where $\omega_{LO,j}$ is the local oscillator frequency applied to signals at each carrier frequency $L_j$.

If there are m satellite in view, then the number of punctual coherent references per frequency is 2 m. They are for example digital signals quantized with one or more bits generated at least at the Nyquist rate of the full bandwidth (at least 20.46 Mbps in the case of GPS).

The time T, WGS-84 time-position $\vec{P}$ and time drift-velocity $\vec{V}$ vectors determined by the GPS receiver 20 are applied to a delay doppler estimator 3 which is designed to determine from these signals a delay-doppler shifted version of the punctual coherent references of the signals L1, L2 and L5. The estimator 3 uses the values T, $\vec{P}$ and $\vec{V}$, the ephemeris of the GPS satellites, which are assumed to be available also from the GPS receiver 20, and a model of the Earth surface, to compute the position of the specular reflection point $P_{S,k}$ over the mean sea surface and the delays and doppler which each reflected signal from each satellite in view should arrive to the downward-looking antenna 19, relative to the direct signals. The model of the Earth surface is preferably an adequate model of the Earth geoid, for example the World Geodetic System 1984 model, Then the estimator 3 determines a "time observation window" per reflection which sets a minimum and maximum delay to be observed around the estimated value for each specular reflection point $P_{S,k}$. This ensures that a full waveform will be generated around a peak of reflection.

In the time-delay domain, the reflected signals from a particular GPS satellite starts at the delay corresponding to the point of specular reflection (shortest delay by definition) and extends through larger delays depending on the roughness of the reflection surface: the rougher the surface the longer the echo of the reflected signal is. Therefore, one of outputs of the estimator 3 is an array of delay values per GPS satellite which defines an observation window in which the waveform of the reflected signal of that particular GPS satellite is estimated to be received. The spacing between delay lags corresponds to the sampling period of the digital signals. Since the GPS signals have a base band bandwidth of 10.23 MHz, the sampling period is likely to be just over double that rate to respect to Nyquist, i.e. about half the P-code chip. Taking as delay unit one half of the P-code chip, the array of time-delay outputs by the delay and doppler estimator 3 may have a dimension equal to a convenient power of 2, such as n=128, but other values are possible, In FIG. 3, the number of delay-lags in the observation window has been labeled by "n" and are the outputs of the estimator 3 which outputs one delay array per GPS satellite, which is the same for all carrier frequencies and polarizations. The lag position corresponding to a specular point can be safely chosen considering uncertainties in its estimation. It may be necessary for practical reasons to start the observation window well ahead the point of specular reflection. This may help to measure the noise floor using samples in front of the echo waveform.

Just as an example, we may assume that the position of the specular reflection point correspond to a lag number 43, that is about 30% into the observation window leaving 85 samples for the waveform which corresponds to a spatial sampling on the ocean between 80 and 200 km depending on the incidence angle θ.

In the doppler-frequency domain, the sampling period is determined by the Nyquist rate of the doppler spread of the first P-code chip on the ocean surface. These doppler spread $B_D$ around the point of specular reflection $P_{S,k}$ depends on the incident angle α, but it ranges between $B^D 500$ Hz at nadir to $B_D=200$ Hz at 60° incidence. Thus the dopplor sampling has to be $\Delta B_D=100$ Hz. For altimetry purpose, it is not interesting to process waveforms in the doppler domain and therefore, the number of doppler samples is restricted in the present invention just to a few. The proposed number is only 3 per carrier frequency (L1, L2, L5), The estimator 3 can be implemented using a signal processor controlled by a suitable program.

The estimated delay arrays defining the time observation windows and the punctual coherent references of the signals L1, L2 and L5 are respectively sent to variable time-delay blocks 7, 8, 9 (one per carrier frequency), which time-shift the punctual coherent references coming out of the GPS receiver 20 for each satellite and to all values of the delay array.

The outputs of the time delay blocks is the set of time-shifted replicas of its inputs:

$$d_{ijkl}(t) = \sqrt{2\alpha_i P_{P,k}} \; XP_k\left(t - \frac{A_k}{f_j^2} - T_k - \frac{1T_P}{2}\right) D_k\left(t - \frac{A_k}{f_j^2} - T_k - \frac{1T_P}{2}\right) \quad (5)$$

$$\sin\left[2\pi(\omega_{jk} - \omega_{LO,j})\left(t + \frac{A_k}{f_j^2} - T_k - \frac{1T_P}{2}\right) + \phi_{ijk}\right]$$

where $T_k$ is the time delay of the point of specular reflection of a particular GPS satellite with respect to the direct signal, minus 43 (or other suitable number) of half P-code chips, and l=1, 2, . . . , n is the delay lag index. Since there are two polarizations (RHCP and LHCP), m CPS satellites in view and n delay lags, the number of output signals of each time-delay blocks 7, 8, 9 is 2 mn. Assuming there are six GPS satellites in view and n=128, this number of output signals is 1536 time shift replicas in total per carrier frequency.

The blocks 7, 8, 9 are advantageously implemented using digital technology. the arrays of time-shifted punctual coherent references are then complex (in-phase and quadrature) doppler shifted according to the three frequencies estimated by the delay and doppler estimator 3.

The three doppler shifts per carrier frequency outputted by the estimator 3 are applied respectively to numerically-controlled oscillators (NCO) 4, 5, 6 (one per carrier frequency), which generate perfect in-phase and quadrature sinusoids at each input frequency minus maximum expected doppler bandwidth $B_D=500$ Hz. The $B_D$ frequency offset avoids aliasing problems of the doppler spread within the first chip zone. Since the doppler spread within the first chip zone can be as narrow as typically 200 Hz at 60° incidence from Low Earth Orbit, the doppler sampling has to be done at $\Delta B_D=100$ Hz.

The output of the $j^{th}$ carrier frequency NCO is for the in-phase component:

$$s_j(t) = \cos 2\pi[\omega_{jk,S} - (B_D + l'\Delta B_D)]t \quad (6)$$

and for the quadrature component:

$$s_j(t) = \sin 2\pi[\omega_{jk,S} - (B_D + l'\Delta B_D)]t \quad (7)$$

where $\omega_{jk,S}$ is the doppler shift for the $j^{th}$ carrier and the $k^{th}$ GPS satellite at the point of specular reflection $P_{S,k}$ and l'=−1, 0 and +1 to generate the three doppler samples.

For three doppler samples, each NCO oscillators 7, 8, 9 outputs six signals (in-phase and quadrature) for each GPS satellite. A more sophisticated implementation is possible with a doppler bandwidth made frequency and satellite dependent $B_D=B_{Djk}$. This has an impact on the band-pass filter bank 11, 12, 13 which is disposed before the signal processing.

The oscillators 4, 5, 6 can be implemented by a software function or by hardware digital technology.

The doppler-shifted signals thus generated are then modulated respectively by the delayed punctual coherent references from the time-delay blocks 7, 8, 9 respectively in a first set of three signal multipliers 31, 32, 33, so as to obtain a modulated doppler-shifted carrier for each delay and satellite.

The output of this set of signal multipliers is for the in-phase component:

$$d^I_{ijkll'}(t) = \sqrt{2\alpha_i P_{P,k}} \; XP_k\left(t - \frac{A_k}{f_j^2} - T_k - \frac{1T_P}{2}\right) \quad (8)$$

$$D_k\left(t - \frac{A_k}{f_j^2} - T_k - \frac{1T_P}{2}\right) \sin\left[2\pi(\omega_{jk} - \omega_{LO,j} - \omega_{jk,S} + B_D + 1'\Delta B_D)\right.$$

$$\left.\left(t + \frac{A_k}{f_j^2} - T_k - \frac{1T_P}{2}\right) + \phi_{ijk}\right]$$

and for the quadrature component:

$$d^Q_{ijkll'}(t) = \sqrt{2\alpha_i P_{P,k}} \; XP_k\left(t - \frac{A_k}{f_j^2} - T_k - \frac{1T_P}{2}\right) \quad (9)$$

$$D_k\left(t - \frac{A_k}{f_j^2} - T_k - \frac{1T_P}{2}\right) \cos\left[2\pi(\omega_{jk} - \omega_{LO,j} - \omega_{jk,S} + B_D + 1'\Delta B_D)\right.$$

$$\left.\left(t + \frac{A_k}{f_j^2} - T_k - \frac{1T_P}{2}\right) + \phi_{ijk}\right]$$

where the upper side bands of the resulting multiplication products are assumed to be filtered out. The number of signals at the output of the first set of signal multipliers 31, 32, 33 is six doppler samples times the number of time-shifted replicas, or 12 mn (9216 with the same assumptions as above).

The signal processing unit 10 further comprises a down-looking GPS receiver 17 which in parallel performs reception through the downward-looking antenna 19, amplification of the signals received and frequency de-multiplexing. To this effect, the down-looking GPS receiver 17 comprises an L-band receiver which is capable of receiving all GPS signal bands (L1, L2 and L5 in the present case) and which outputs a signal in bands respectively corresponding to L1, L2 and L5.

The signals received by the antenna 19 has an expression in the form:

$$r_{ij}(t) = \sum_{k=1}^{m} r_{ijk}(t) \quad (10)$$

where i indicates the polarization, j the carrier frequency (L1, L2, L5), m the number of GPS satellites being received through the reflected path and $r_{ijk}(t)$ is the signal from a particular $k^{th}$ GPS satellite. The expression of the reflected signal $r_{ijk}(t)$ of a particular polarization, frequency and satellite is:

$$r_{ijk}(t) = \int_A \sqrt{2G_{ijk}(P)\sigma_{b,ijk}(P)P_{C,k}} \, XG_k\left(t - \tau_{jk}(P) - \frac{A'_k}{f_j^2}\right) D_k\Big( \quad (11)$$

$$t - \tau_{jk}(P) - \frac{A'_k}{f_j^2}\Big) \cos\left[2\pi\omega'_{jk}(P)\left(t - \tau_{jk}(P) - \frac{A'_k}{f_j^2}\right) + \phi'_{ijk}\right] dA +$$

$$\int_A \sqrt{2G_{ijk}(P)\sigma_{b,ijk}(P)P_{P,k}} \, XP_k\left(t - \tau_{jk}(P) - \frac{A'_k}{f_j^2}\right)$$

$$D_k\left(t - \tau_{jk}(P) - \frac{A'_k}{f_j^2}\right) \sin\left[2\pi\omega'_{jk}(P)\left(t - \tau_{jk}(P) - \frac{A'_k}{f_j^2}\right) + \phi'_{ijk}\right] dA$$

where A is the complete ocean surface in visibility of the downward-looking antenna 19, P is a point on this surface, $G_{ijk}(P)$ is the gain of the antenna 19 in the direction of P, $\sigma_{b,ijk}(P)$ is the bi-static radar cross-section per unit area, $\tau_{jk}(P)$ is the delay of the signal reflected with respect to the direct signal, $\omega'_{jk}(P)$ is the frequency of the reflected signal through P, dA is an element of surface centered at P and $A'_k$ is a constant related to the total electron content ($TEC'_k$) of the ionosphere in the path between the $k^{th}$ satellite and point P and then to the antenna 19:

$$A'_k = \frac{40.3}{c} TEC'_k \quad (12)$$

The down-looking GPS receiver 17 does not perform the typical operations of a conventional GPS receiver. It only frequency-demultiplexes the incoming signals for each polarizations into three complex (in-phase and quadrature) outputs, one for each carrier frequency L1, L2, L5. For the down conversion, the down-looking receiver 17 uses the same local oscillator as the up-looking receiver 20. Physically, both the up- and down-looking receivers should form part of the same receiver unit. The three outputs $r_{L1}, r_{L2}$ and $r_{L5}$ of the down-looking receiver 17 have the following expression for the in-phase and component:

$$r^I_{ijk}(t) = \int_A \sqrt{2G_{ijk}(P)\sigma_{b,ijk}(P)P_{C,k}} \quad (13)$$

$$XG_k\left(t - \tau_{jk}(P) - \frac{A'_k}{f_j^2}\right) D_k\left(t - \tau_{jk}(P) - \frac{A'_k}{f_j^2}\right)$$

$$\cos\left[2\pi(\omega'_{jk}(P) - \omega_{LO,j})\left(t - \tau_{jk}(P) - \frac{A'_k}{f_j^2}\right) + \phi'_{ijk}\right] dA +$$

$$\int_A \sqrt{2G_{ijk}(P)\sigma_{b,ijk}(P)P_{P,k}} \, XP_k\left(t - \tau_{jk}(P) - \frac{A'_k}{f_j^2}\right)$$

$$D_k\left(t - \tau_{jk}(P) - \frac{A'_k}{f_j^2}\right)$$

$$\sin\left[2\pi(\omega'_{jk}(P) - \omega_{LO,j})\left(t - \tau_{jk}(P) - \frac{A'_k}{f_j^2}\right) + \phi'_{ijk}\right] dA$$

and for the quadrature component:

$$r^Q_{ijk}(t) = \quad (14)$$

$$-\int_A \sqrt{2G_{ijk}(P)\sigma_{b,ijk}(P)P_{C,k}} \, XG_k\left(t - \tau_{jk}(P) - \frac{A'_k}{f_j^2}\right) D_k\Big(t - \tau_{jk}(P) -$$

$$\frac{A'_k}{f_j^2}\Big) \sin\left[2\pi(\omega'_{jk}(P) - \omega_{LO,j})\left(t - \tau_{jk}(P) - \frac{A'_k}{f_j^2}\right) + \phi'_{ijk}\right] dA +$$

$$\int_A \sqrt{2G_{ijk}(P)\sigma_{b,ijk}(P)P_{P,k}} \, XP_k\left(t - \tau_{jk}(P) - \frac{A'_k}{f_j^2}\right)$$

$$D_k\left(t - \tau_{jk}(P) - \frac{A'_k}{f_j^2}\right)$$

$$\cos\left[2\pi(\omega'_{jk}(P) - \omega_{LO,j})\left(t - \tau_{jk}(P) - \frac{A'_k}{f_j^2}\right) + \phi'_{ijk}\right] dA$$

where $\omega_{LOj}$ is the frequency of the local oscillator for the particular $j^{th}$ carrier frequency (L1, L2, L5). Since there is a complex output per polarization, the total number of output reflected signals per frequency is tour.

The four reflected signals coming out from the down-looking GPS receiver 17 are then multiplied by the time-shifted punctual coherent references in a second set of multipliers 34, 35, 36. The results output by these multipliers comprise products between in-phase components as between quadrature components, but also mixed products between in-phase and quadrature components. In addition, there are products coming from the same polarization channel (RHCP with RHCP and LHCP with LHCP) as well as from different polarization channels (RHCP with LHCP). Assuming that the upper side band of the products is filtered out and taking into account that the cross-correlations between codes (C/A- and P-codes in the present case) is null, the output of the second set of multipliers has the following form (only the in-phase in-phase product is shown):

$$d^I_{ijkl'}(t) \times r^I_{ijk}(t) = \int_A 2P_{P,k} \sqrt{2\alpha_i G_{ijk}(P)\sigma_{b,ijk}(P)} \quad (15)$$

$$XP_k\left(t - \tau_{jk}(P) - \frac{A'_k}{f_j^2}\right) XP_k\left(t - \frac{A_k}{f_j^2} - T_k - \frac{1T_P}{2}\right)$$

$$D_k\left(t - \tau_{jk}(P) - \frac{A'_k}{f_j^2}\right) D_k\left(t - \frac{A_k}{f_j^2} - T_k - \frac{1T_P}{2}\right)$$

$$\cos[2\pi(\omega'_{jk}(P) - \omega_{jk} + \omega_{jk,s} - B_D - 1'\Delta B_D)t + \Delta\phi_{ijk}(P)]dA$$

where:

$$\Delta\phi_{ijk}(P) = 2\pi(\omega'_{jk}(P) - \omega_{LO,j})\left(-\tau_{jk}(P) - \frac{A'_k}{f_j^2}\right) + \phi'_{ijk} - \qquad (16)$$

$$2\pi(\omega_{jk} - \omega_{LO,j} - \omega_{jk,s} + B_D + 1'\Delta B_D)\left(\frac{A_k}{f_j^2} - T_k - \frac{1T_P}{2}\right) - \phi_{ijk}$$

Since the delay and doppler estimator 3 ensures that within the first few tens of P-code chip zones:

$$D_k\left(t - \tau_{jk}(P) - \frac{A'_k}{f_j^2}\right)D_k\left(t - \frac{A_k}{f_j^2} - T_k - \frac{1T_P}{2}\right) = 1 \qquad (17)$$

The equation (15) can be written as:

$$d^1_{ijkll'}(t) \times r^1_{ijk}(t) = \int_A 2P_{P,k}\sqrt{2\alpha_i G_{ijk}(P)\sigma_{b,ijk}(P)} \qquad (18)$$

$$XP_k\left(t - \tau_{jk}(P) - \frac{A'_k}{f_j^2}\right)XP_k\left(t - \frac{A_k}{f_j^2} - T_k - \frac{1T_P}{2}\right)$$

$$\cos[2\pi(\omega'_{ij}(P) - \omega_{jk} + \omega_{jk,S} - B_D - 1'\Delta B_D)t + \Delta\phi_{ijk}(P)]dA$$

Since there are four reflected signals and 12 mn shifted references, there are 48 mn product signals of this type per carrier frequency (48 mn=36864 with the assumptions above).

Every output of the second multipliers set is applied to a code processor 16 and through respective band-pass filters 11, 12, 13 to a carrier phase processor 15.

The code processor 16 is designed to perform digital operations on the mixed signals received to obtain a rough estimation of the height h of the specular reflection points $P_S$ (one per satellite). These estimations are obtained by processing delay measurements and GPS signals (C/A—Coarse/Acquisition and P—Precise Codes in the case of GPS). These processing are not here detailed since they can be performed in many known ways.

For example, the waveforms provided at the output of the code processor 16 can he fitted with a model. A point of the leading edge of the waveform which has at least sensitivity to surface roughness is selected as tracking point for altimetry. The waveform move back and forth in the delay domain and the delay-tracking of the selected point serves as observable for the surface height of the ocean, as in conventional altimetry. The use of three frequencies allows to correct for the ionospheric delay, which at L-band can be in the order of meters. As a by product, the excess delay due to the ionosphere can be estimated and therefore a measurement of the total electron content (TEC) over the oceans is possible, which is most needed due to the lack of ground-based TEC observations. The fitting of the model takes into account the surface roughness, and thus wind speed and significant wave height. From the shape of the waveform, in particular, from the amplitude of the peak of waveform, information from wind speed can be retrieved. The rougher the surface the lower the peak is. Accurate models have been developed which have shown accuracy to 2 m/s from aircraft using GPS reflected signals and waveform models.

By measuring the different polarizations at different doppler and delay bins, and taking into account the different geometry offered by each reflection points, it may also be possible to get wind direction using the different polarizations.

In summary, the code processor 16 estimate surface height, wind speed and direction, significant wave height and ionosphere total electron content.

The band-pass filters 11, 12, 13 provide a degree of band-pass filtering to reduce thermal noise, self noise and an unwanted part of the geophysical noise. This filtering is performed per delay doppler mixed input and per satellite.

The center frequency of each band-pass filter 11, 12, 13 is the offset frequency to avoid aliasing, that is $B_D$. Depending on the value of the doppler sample (value of l'), the filter is responsive to a strip on the ocean surface containing the point of specular reflection $P_{S,k}$ (l'=0), or to the parallel strips on either sides of the center strip. (l'±1). The bandwidth of the filters is equal to the sampling period in the doppler domain, that is $\Delta B_D$, and determines the width of the strips on the ocean to which each filter is sensitive to. The filter width is further chosen to be equivalent to an integration time multiple of the GPS code period. The P-code has currently an effective period of one week, which is not useful for this purpose, but in a modernized GPS, signal, it is likely that the high rate code will have a short period, like the C/A-code nowadays that has a period of 1 ms. Assuming a high rate code period of 1 ms, the width of the pass-band filter must be a sub-multiple of 1 kHz. This condition is fulfilled since $\Delta B_D$=100 Hz. In summary the frequency response of the pass-band filter can be of the following type (for positive frequencies):

$$H(f)_k = \text{sinc}\frac{f - B_D}{\Delta B_D} \qquad (19)$$

where $$\text{sinc}(x) = \frac{\sin(\pi x)}{\pi x}.$$

The width of such filters between first zeroes is $2\Delta B_D$= 200 Hz. In a more complex implementation, the filter frequency response could be made frequency and satellite dependent, that is, $B_D=B_{D,jk}$, as mentioned above.

The output of the band-pass filters 11, 12, 13 are filtered waveforms in a two-dimensional space, delay and doppler. The width in the doppler domain expands only three samples (range of l') while the length in the delay domain is 128 samples (range of l). There are filtered products between in-phase and quadrature components, but also mixed products between in-phase and quadrature components. In addition, there are products of coming from the same polarization channel as well as from different polarization channels. Thus each filtered product as an expression of the following type:

$$F^{1l}_{ijkll'}(t) \equiv d^l_{ijkll'}(t)r^l_{ijk}(t) * h(t) \qquad (20)$$

where h(t) is the filter impulse response:

$$h(t) = \text{rect}(\Delta B_D t)\cos 2\pi B_D t \qquad (21)$$

where rect(Bt) is 1 for $$\text{abs}(t) < \pm\frac{1}{2B},$$

otherwise.

So the output of the filters is of the type (only the in-phase component shown):

$$F^{ll'}_{ijkll'}(t) = \int_A 2P_{P,k}\sqrt{2\alpha_i G_{ijk}(P)\sigma_{b,ijk}(P)} \int_{-1/2\Delta B_D}^{+1/2\Delta B_D} \cos 2\pi B_D \tau \quad (22)$$

$$XP_k\left(t-\tau-\tau_{jk}(P) - \frac{A'_k}{f_j^2}\right) XP_k\left(t-\tau - \frac{A_k}{f_j^2} - T_k - \frac{1T_P}{2}\right)$$

$$\cos[2\pi(\omega'_{jk}(P) - \omega_{jk} + \omega_{jk,s} - B_D - 1'\Delta B_D)(t-\tau) +$$

$$\Delta\phi_{ijk}(P)]dA d\tau$$

Combining the product of cosines into the sum of the sum and the difference of arguments and neglecting the tipper side band which can be easily filtered out gives:

$$F^{ll'}_{ijkll'}(t) = \int_A 2P_{P,k}\sqrt{2\alpha_i G_{ijk}(P)\sigma_{b,ijk}(P)} \quad (23)$$

$$\int_{-1/2\Delta B_D}^{+1/2\Delta B_D} XP_x\left(t-\tau-\tau_{jk}(P) - \frac{A'_k}{f_j^2}\right) XP_k\left(t-\tau - \frac{A_k}{f_j^2} - T_k - \frac{1T_P}{2}\right)$$

$$\cos 2\pi[(\omega'_{jk}(P) - \omega_{jk} + \omega_{jk,s} - B_D - 1'\Delta B_D)t -$$

$$(\omega'_{jk}(P) - \omega_{jk} + \omega_{jk,s} - 1'\Delta B_D)\tau + \Delta\phi_{ijk}(P)]dA d\tau$$

Only those points P on the ocean surface belonging to the delay and doppler bin selected (specific values for l and l'), that is those for which:

$$XP_k\left(t-\tau-\tau_{jk}(P) - \frac{A'_k}{f_j^2}\right) XP_k\left(t-\tau - \frac{A_k}{f_j^2} - T_k - \frac{1T_P}{2}\right) \approx 1 \quad (24)$$

and $$\omega'_{jk}(P) - \omega_{jk} + \omega_{jk,s} - 1'\Delta B_D \approx 0 \quad (25)$$

within the integration time, $1/\Delta B_D$ contribute to the output of the band-pass filter. For these points, the filter outputs become:

$$F^{ll'}_{ijkll'}(t) = \int_A 2P_{P,k}\sqrt{2\alpha_i G_{ijk}(P)\sigma_{b,ijk}(P)} \cos[2\pi(B_D t - \Delta\phi_{ijk}(P)]dA \quad (26)$$

which has the form of a sum of cosine functions of equal frequency $B_D$ and random phase.

The carrier phase processor 15 estimates the relative height h of the specular points $P_s$ as well as other data such as a significant wave height SWH, the wind speed and direction W and the total electron content TEC. This processor is implemented by software. However a hardware solution through an ASIC would be preferable if a fast processing is required.

The carrier phase processor 15 performs an interferometric processing between the inputs corresponding to the same delay and doppler bin (same l and l') but different carrier frequency. Such a processing consists in a cross-correlation of the type:

$$\langle F^{ll'}_{ij_1 kll'}(t) F^{ll'}_{ij_2 kll'}(t)\rangle \quad (27)$$

with "< >" meaning average value, $j_1$ and $j_2$ representing a different pair of frequencies out of L1, L2 and L5. It has been demonstrated by software simulation that the phase $\phi_{j_1,j_2}$ of such cross-correlation is sensitive to the average surface height H in a linear fashion:

$$\frac{\Phi_{j_1 j_2}}{k_{j_1 j_2}} = aH + b \quad (28)$$

where $k_{j_1,j_2}$ is a synthetic wave number defined by the following equation:

$$k_{j_1 j_2} = \frac{2\pi}{\lambda_{j_1 j_2}} \quad (29)$$

with $$\lambda_{j_1 j_2} = \frac{c}{f_{j_1} - f_{j_2}} \quad (30)$$

If the standard deviation of the wave height is higher than half the wavelength of the used GPS signals, cycle slips appear. Hence, the method according to the invention can be extended to rougher seas by combining GPS signals in order to get longer, wavelengths.

Generally the linear combination of two phases $\phi_1$ and $\phi_2$ is defined by $\phi=n_1 \phi_1+n_2\phi_2$ where $n_1$ and $n_2$ are arbitrary numbers. Substitution of the relation $\phi_i=f_i t$ for the corresponding frequencies $f_1$ and $f_2$ yields to $f=n_1 f_1+n_2 f_2$.

In the case of GPS, the linear combination of L1 and L2 carrier phases is performed with $n_1=1$ and $n_2=-1$, leading to the difference $\Phi_{L1-L2}=\phi_{L1}-\phi_{L2}$ denoted as wide-lane and corresponding to a wavelength $\lambda_{L1-L2}=86.2$ cm ($\lambda_{L1}=19.03$ cm and $\lambda_{L2}=24.43$ cm).

Assuming a given noise level for the phase measurements, it can be seen that the noise level will increase for the linear combinations. Applying the error propagation law and assuming the same noise for both phases, the noise of the sum or difference formed by $\phi_{L1}$ and $\phi_{L2}$ is higher by a factor $\sqrt{2}$ than the noise with a single phase. However, the integer ambiguity resolution is much easier and the presence of cycle slips is minimized with respect to the case of a single GPS frequency.

When using three different carrier frequencies L1, L2 and L5, the combinations L1–L5 and L2–L5 of carrier phases can be performed providing the wide-lane phases $\Phi_{L1-L5}$ and $\Phi_{L2-L5}$. For a flat ocean surface, both the wide-lanes phases are constant and proportional to the path difference between direct and reflected signals, up to an integer number of wavelengths and the thermal noise present in the measurement. For a GPS satellite 2 at the zenith of the receiver 1, one cycle of the L1–L5 and L2–L5 wide-lane phases correspond to a height change of 0.75 and 5.81 m, respectively, and a carrier phase accuracy of 1% results in height resolutions of 7.5 and 58.1 mm, respectively.

When the ocean is rough, the phase of each frequency changes rapidly due to the doppler spread, but the wide-lane phases change much more slowly, their average value being proportional to the path difference as before. For a slightly rough ocean surface, the deviation of the wide-lane phases with respect to their average value is small. As ocean roughness increases, so do the deviations of the short wide-lane L1–L5 phases. When the standard deviation of the wave height is half the wide-lane wavelength, cycle ambiguity starts to occur (a phase deviation beyond one cycle). This point corresponds to a significant wave height of 1.5 m. The longer wide-lane phases suffer a similar effect, but at a higher significant wave height of about 12 m, making this the most robust of the two wide-lane phases for ocean altimetry.

Another advantage of these combinations is that they maintain the integer nature of the associated ambiguities ($N_{L1-L2}=N_{L1}-N_{L2}$), whereas the wavelength associated is greater than any corresponding to the involved frequencies. Some ambiguity resolution techniques use these combinations to help solving the ambiguities. In the present case, such combinations are of great usefulness due to the fact that it can be used to apply an interferometric treatment to surfaces with a higher degree of roughness.

By using such wide-lane combinations, the time delay of the reflected signal in a point P can be retrieved by:

$$\tau(P) = \frac{\phi_x - \phi_y}{2\pi(f_x - f_y)} + \tau_S \quad (31)$$

where $f_x$ and $f_y$ are respectively L1 or L2 and L2 or L5 carrier frequencies, depending on the number (two or three) of carrier frequencies used, and $\tau_S=\tau(P_S)$ is the time delay of the reflected signal in the point $P_S$ of specular reflection over the mean sea surface.

The equation (31) shows that the delay varies linearly with the phase, that is a delay change in time (height change) makes the phase change, and vice versa.

The coarse values of significant wave height SWH and wind speed and direction W are retrieved from input waveforms to the code processor 16 and refine through the carrier phase processor 15. Models are used to map the waveforms to geophysical parameters. The total electron content TEC is retrieved from delay time estimations at the different carriers L1, L2, L5. As the ionosphere is dispersive, group delay at different frequencies is different. In fact, it varies as the inverse of the square of the frequency. The TEC can be estimated by the code processor 16 by looking to the delays across frequencies, this estimation being then refined within the carrier phase processor 15.

There is claimed:

1. A method for performing Earth altimetry comprising the steps of:
    receiving by an upward-looking antenna onboard a platform above the Earth surface direct signals having at least two different carrier frequencies transmitted by GNSS satellites in view of said upward-looking antenna,
    receiving by a downward-looking antenna onboard said platform signals reflected by the Earth surface and having said at least two different carrier frequencies, and
    comparing carrier phases of said direct signals and said received reflected signals at said carrier frequencies, and determining a surface height from said compared carrier phases.

2. The method according to claim 1, wherein said direct and reflected signals received have three different carrier frequencies, said phase comparisons being performed at each of said three frequencies between said direct and reflected signals, and also between said direct and received signals when the direct and received signals have different frequencies.

3. The method according to claim 2, wherein said carrier frequencies are chosen so that a first and a second of said three carrier frequencies are closer to one another than a third of said carrier frequencies.

4. The method according to claim 1, wherein said direct and reflected signals received have two different circular polarizations.

5. The method according to claim 1, further comprising the step of determining a total atmospheric electron content from said phase comparisons.

6. The method according to claim 1, further comprising applying said method to ocean altimetry and further comprising a step of determining from said phase comparisons wind speed and direction, a height value of ocean waves and a total electron of the ionosphere.

7. A method for performing Earth altimetry comprising the steps of:
    receiving by an upward-looking antenna onboard a platform above the Earth surface direct signals having at least two different carrier frequencies transmitted by GNSS satellites in view of said upward-looking antenna;
    receiving by a downward-looking antenna onboard said platform signals reflected by the Earth surface and having said at least two different carrier frequencies;
    comparing carrier phases of said direct signals and said received reflected signals at said carrier frequencies;
    determining a surface height from said compared carrier phases; and
    determining for each GNSS in view a point of specular reflection of said direct signals on the Earth surface and determining time observation windows during which the reflected signals should arrive to the downward-looking antenna.

8. The method according to claim 7, wherein said received reflected signals for each of said carrier frequencies and for each GNSS satellite in view has a delay and a doppler shift, said method further comprising the step of generating at each of said carrier frequencies and for each GNSS satellite in view clean replicas of the received signals, said clean replicas having the same delays and doppler shifts as the received reflected signals, while taking into account said time observation windows, and phase comparisons being performed between said received reflected signals and said delayed and doppler-shifted clean replicas.

9. An Earth altimetry device comprising:
    an upward-looking antenna onboard a platform for receiving direct signals having at least two carrier frequencies from GNSS satellites in view,
    a downward-looking antenna onboard said platform for receiving reflected signals at said at least two carrier frequencies, said reflected signals being transmitted by each of said GNSS satellites and reflected by an Earth surface,
    a GNSS receiver connected to said upward-looking antenna for providing direct signals having said at least two carrier frequencies,
    a frequency de-multiplexer connected to said downward-looking antenna for separating said received reflected signals into reflected signals having respectively said at least two carrier frequencies,
    phase comparison means for comparing carrier phases of said direct signals outputted by said GNSS receiver and reflected signals outputted by said frequency de-multiplexer at said at least two carrier frequencies, and means for determining a surface height from said phase comparisons performed by said phase comparison means.

10. An Earth altimetry device comprising:
    an upward-looking antenna onboard a platform for receiving direct signals having at least two carrier frequencies from GNSS satellites in view;
    a downward-looking antenna onboard said platform for receiving reflected signals at said at least two carrier frequencies, said reflected signals being transmitted by each of said GNSS satellites and reflected by an Earth surface;

a GNSS receiver connected to said upward-looking antenna for providing direct signals having said at least two carrier frequencies;

a frequency de-multiplexer connected to said downward-looking antenna for separating said received reflected signals into reflected signals having respectively said at least two carrier frequencies;

phase comparison means for comparing carrier phases of said direct signals outputted by said GNSS receiver and reflected signals outputted by said frequency de-multiplexer at said at least two carrier frequencies, and means for determining a surface height from said phase comparisons performed by said phase comparison means;

means for processing said received direct signals, said processing means outputting navigational data and clean replicas of said direct signals for each of said at least two carrier frequencies and GNSS satellites;

a delay and doppler estimator for determining from said navigational data and for each of said GNSS satellites a point of specular reflection on said surface and time-delays and doppler shifts at which each said received reflected signals should arrive to said downward-looking antenna and for determining a time observation window for each said received reflected signal;

time-delay blocks for time delaying said clean replicas at all times as a function of each said time observation window;

numerically controlled oscillators for generating a carrier frequency signal which is shifted by said doppler shifts for each of said at least two carrier frequencies;

a first set of signal multipliers for modulating said doppler-shifted carriers with the delayed clean replicas; and a second set of signal multipliers for modulating the modulated signals outputted by said first set of signal multipliers with the separated reflected signals, the modulated signals outputted by said second set of multipliers being applied to said phase comparison means.

11. A low earth orbit satellite for performing ocean altimetry comprising:

an upward-looking antenna onboard a platform for receiving direct signals having at least two carrier frequencies from GNSS satellites in view, a downward-looking antenna onboard said platform for receiving signals at said at least two carrier frequencies, with said received signals being transmitted by each of said GNSS satellites and reflected by the Earth surface, a GNSS receiver connected to said upward-looking antenna for providing direct signals having said at least two carrier frequencies, a frequency de-multiplexer connected to said downward-looking antenna for separating said received reflected signals into reflected signals having respectively said at least two carrier frequencies, phase comparison means for comparing carrier phases of said direct signals outputted by said GNSS receiver and reflected signals outputted by said frequency de-multiplexer at said at least two carrier frequencies, and means for determining a surface height from phase comparisons performed by said phase comparison means.

12. An airborne device for performing ocean altimetry comprising:

an upward-looking antenna onboard a platform for receiving direct signals having at least two carrier frequencies from GNSS satellites in view, a downward-looking antenna onboard said platform for receiving signals at said at least two carrier frequencies, with said received signals being transmitted by each of said GNSS satellites and reflected by the Earth surface, a GNSS receiver connected to said upward-looking antenna for providing direct signals having said at least two carrier frequencies, a frequency de-multiplexer connected to said downward-looking antenna for separating said received reflected signals into reflected signals having respectively said at least two carrier frequencies, phase comparison means for comparing carrier phases of said direct signals outputted by said GNSS receiver and reflected signals outputted by said frequency de-multiplexer at said at least two carrier frequencies, and means for determining a surface height from phase comparisons performed by said phase comparison means.

* * * * *